US012776043B2

(12) United States Patent
Krauss et al.

(10) Patent No.: US 12,776,043 B2
(45) Date of Patent: Oct. 27, 2026

(54) METHOD FOR ACQUIRING A TWO-DIMENSIONAL MAGNETIC RESONANCE IMAGE OF A SLICE THROUGH A REGION OF INTEREST

(71) Applicant: Siemens Healthineers AG, Forchheim (DE)

(72) Inventors: Bernhard Krauss, Burgthann (DE); Florian Maier, Buckenhof (DE); Waqas Majeed, Ellicott, MD (US)

(73) Assignee: Siemens Healthineers AG, Forchheim (DE)

( * ) Notice: Subject to any disclaimer, the term of this patent is extended or adjusted under 35 U.S.C. 154(b) by 186 days.

(21) Appl. No.: 18/646,845

(22) Filed: Apr. 26, 2024

(65) Prior Publication Data

US 2024/0362789 A1 Oct. 31, 2024

(30) Foreign Application Priority Data

Apr. 26, 2023 (EP) .................................... 23169938

(51) Int. Cl.
*A61B 5/055* (2006.01)
*G06T 7/11* (2017.01)
*G06T 12/20* (2026.01)

(52) U.S. Cl.
CPC ................ *G06T 7/11* (2017.01); *G06T 12/20* (2026.01); *G06T 2207/10088* (2013.01)

(58) Field of Classification Search
CPC ................................................ G01R 33/56572
See application file for complete search history.

(56) References Cited

U.S. PATENT DOCUMENTS 8,054,079 B2 11/2011 Hebrank et al.
2021/0055365 A1 2/2021 Hoshiyama et al.

FOREIGN PATENT DOCUMENTS

DE 102019129541 A1 5/2021
WO 2021083610 A1 5/2021

OTHER PUBLICATIONS

Weber, H., et al.: "Local Shape Adaptation for Curved Slice Selection", Magnetic Resonance in Medicine 72:112-123 (2014).
Lai Chin-Ming: "Reconstructing NMR Images Under Non-Linear Field Gradients" Journal of Physics E: Scientific Instruments, vol. 16, No. 1, pp. 34-38, and 335 (noting correction to p. 36); (1983).

*Primary Examiner* — Jason M Ip
(74) *Attorney, Agent, or Firm* — Banner & Witcoff, Ltd.

(57) ABSTRACT

A method for acquiring one or multiple two-dimensional magnetic resonance image of a slice through a region of interest may include receiving a gradient field map defining a transformation from a real space to a gradient space, the gradient space being distorted with respect to the real space due to a non-linearity of the gradients; receiving a nominal size, position and orientation of a target slice in real space; transforming a set of points within the target slice into gradient space, resulting in a distorted set of points defining a distorted slice in gradient space; calculating the position and orientation of a new slice, which approximates the position and orientation of the distorted slice, by shifting and/or tilting the target slice; acquiring a two-dimensional magnetic resonance image by excitation of the new slice; and performing a two-dimensional distortion correction of the two-dimensional image to remove in-plane distortions.

16 Claims, 3 Drawing Sheets

METHOD FOR ACQUIRING A TWO-DIMENSIONAL MAGNETIC RESONANCE IMAGE OF A SLICE THROUGH A REGION OF INTEREST

CROSS REFERENCE TO RELATED APPLICATIONS

This patent application claims priority to European Patent Application No. 23169938.0, filed Apr. 26, 2023, which is incorporated herein by reference in its entirety.

BACKGROUND

Field

The disclosure concerns a method for acquiring a two-dimensional magnetic resonance image of a slice through a region of interest, a computer program, a non-transient computer-readable medium and a magnetic resonance imaging system.

Related Art

Magnetic Resonance (MR) images are reconstructed from acquired raw data under the assumption that the gradient fields used for position encoding of the signal are perfectly linear. However, due to unavoidable non-linearities in the gradient fields of MR scanners, the reconstructed images may be distorted, especially when they are acquired close to or beyond the edge of the specified imaging volume of the scanner. By using an additional correction step (distortion correction), already reconstructed MR images can be mathematically corrected, so that they better represent the scanned object geometry. Such distortion correction methods use the spatial distribution of the gradient fields, also referred to herein as gradient field maps, and in particular the non-linear field components, which in turn may be measured or calculated from the geometry of the gradient coils of the MR scanner. A suitable distortion correction method is for example disclosed in U.S. Pat. No. 8,054,079 B2.

Two different methods are currently known and routinely used on clinical MR scanners:

The first method is three-dimensional (3D) distortion correction, which uses a 3D volume of scanned voxels as input. The method is, in principle, able to completely remove the geometric distortion caused by gradient non-linearities inside the image volume, although the geometric accuracy of the obtained results depends on the scanned voxel size as well as the accuracy of the gradient field map, which is used for the correction. This method is usually used for diagnostic scans or overview scans acquired for planning interventional procedures. Later interventional monitoring or guidance scans are typically planned based on these distortion-corrected 3D scans.

The second method is two-dimensional (2D) distortion correction, which uses a two-dimensional image as input. A similar distortion correction algorithm using the gradient field maps may be used as in 3D distortion correction. Naturally, 2D distortion correction can remove only in-plane distortions. Out-of-plane distortions cannot be corrected for, because no image data is available outside of the image plane, which might be used to calculate a corrected image. 2D distortion correction is nevertheless used in cases when individual 2D slices or a stack of 2D slices are scanned. This may be done because the user prefers it to 3D scans. However, there are also occasions when there is no time to acquire a whole 3D volume and 2D slices must be used instead, for example in real-time imaging for monitoring or guidance. One application is, e.g., to guide needle biopsy procedures. In this case, a biopsy needle is navigated through the human body into a target lesion under live MR imaging. Such procedures are often planned on 3D distortion corrected data sets, which represent the true patient geometry. However, for technical reasons the two-dimensional slice which is to be acquired during the intervention is actually positioned and parametrized in terms of gradient coordinates, i.e. in gradient space. The non-linearity of gradient space with respect to real (physical) space results in the acquisition of a slice which is not necessarily at the position and orientation at which the operator had expected it, especially close to the outer edges of the imaging volume of the MR scanner, but which has an out-of-plane deformation. The slice may be displaced and also tilted with respect to its nominal image plane. In addition, it is observed that higher order out-of-plane deformation is possible (curvature, e.g. "potato chip"-geometry). No correction of the displaced or deformed slice excitation is currently applied. Since the above-mentioned image-based 2D distortion correction can only remove in-plane distortions, the scanned slice may therefore not show the expected anatomy that is seen on the 3D distortion corrected images. Instead, any out-of-plane distortion will remain in the image, to the extent that for some image pixels the acquired slice may be more than 1 cm away from the expected position.

The consequences of this offset depend on the clinical scenario: In interventional procedures such an offset may be obvious as soon as the first slice gets scanned. It is usually possible to move the slice iteratively to the correct position, at which position the slice contains the needle and the target lesion. There is also no big risk that the needle would miss the target lesion as the relative distortion between the two objects vanishes as soon as the needle approaches the target. Hence, in a free-breathing patient, where several corrections of the needle direction are usually needed during the procedure, the slice deformation due to gradient distortion may only cause some inconveniences and/or delays.

However, the fact that the planning scan and the interventional scan show different objects at the same nominal position is very confusing. Especially for less experienced users this may lead to wrong assumptions and interpretations. The same may be true even for experienced interventionalists who are used to Computed Tomography (CT) imaging, where such distortions do not exist.

So far, this problem could only be solved by positioning the region of interest as close as possible to the iso-center of the imaging volume for diagnostic or therapeutic cases, where minimum image distortion was required. For free-hand needle interventions this effectively meant that the needle could not be inserted more than 10 cm away from the iso-center, although the reach-in distance for the interventionalist, which is also connected with the length of the bore, is a critical parameter. For certain body parts like shoulder optimal patient positioning could be difficult.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
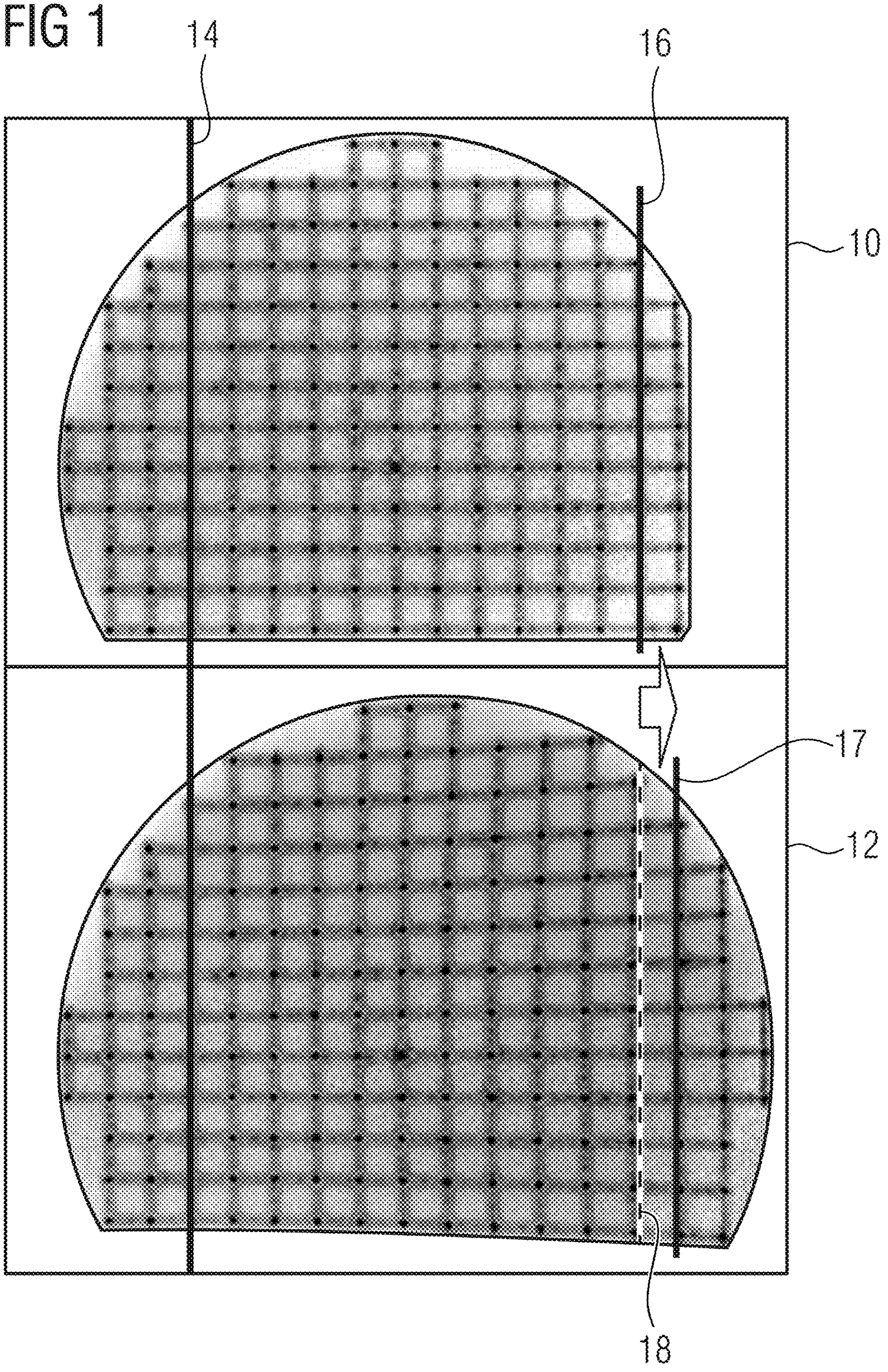
FIG. 1 shows a 2D MR image of a grid with distortion correction (above) and the same 2D MR image without distortion correction (below) according to the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is therefore an object of the disclosure to provide a method for acquiring a two-dimensional MR image of a slice through a region of interest, which reduces distortions due to non-linear gradient fields. It is a further object of the disclosure to provide a method for acquiring a two-dimensional MR image of a slice, which achieves at least the same image quality as the conventional method of 2D distortion correction, which works well in all cases of in-plane distortion, where images get deformed, squeezed or even rotated. It is a further object of the disclosure to provide a method for acquiring a two-dimensional MR image of a slice which does not require a change in acquisition parameters related to scan time and/or image quality. Further objects are that the method should be intuitive to use and predictable in its results.

These and further objects of the disclosure are met by a method, a computer program, a computer-readable medium, and a magnetic resonance system.

According to a first aspect, the disclosure provides a method for acquiring a two-dimensional magnetic resonance image of a slice through a region of interest, the method may comprise:

(a) receiving gradient field maps of the region of interest, the gradient field maps defining a transformation from a real space to a gradient space, the gradient space being distorted with respect to the real space due to a non-linearity of the gradient fields;

(b) receiving a nominal size, position and orientation of a target slice, from which the image is to be acquired, in real space;

(c) performing a transformation of a set of points within the target slice into gradient space by using the gradient field maps, resulting in a distorted set of points defining a distorted slice in gradient space;

(d) calculating the position and orientation of a new slice, which approximates the position and orientation of the distorted slice in gradient space, wherein the new slice is obtained by shifting and/or tilting the target slice;

(e) acquiring a two-dimensional magnetic resonance image by excitation of the new slice in gradient space, (f) performing a two-dimensional distortion correction of the two-dimensional image to remove in-plane distortions due to non-linearity of the gradient fields.

Thus, in the method of the disclosure, the excitation of the slice is modified: the slice is internally moved from its nominal or target position (assuming gradient space=real space) to a position in gradient space, which provides an image close to the nominal slice position in real space. In order to achieve this, only a shift as well as a tilt of the slice are allowed. This is advantageous because it has been found that any other motion component might lead to an over- or under-correction by the following 2D distortion correction step in the sense that the image center could move away from its intended position. After the image has been acquired at the position of the new slice, a 2D distortion correction is used to remove in-plane distortion as a post-processing step.

In "real space" means in real world coordinates, which may be a Cartesian coordinate system, and in particular may be the 3D distortion corrected coordinates. In an exemplary embodiment, the slice position and orientation are planned on distortion corrected MR images. If the scan (in particular slice position an orientation) is planned on images without distortion correction, the scanned images are always at the position where they have been planned. However, this has the disadvantage that the distances in such distorted images would be inaccurate, which is highly confusing for planning interventional procedures.

The "gradient space" may mean a gradient coordinate system, which may denote the curvilinear coordinate system in which MR images are usually reconstructed because of the assumed linearity of the x-, y- and z-gradient fields. At the iso-center of the magnet it approximates the real world cartesian coordinate system.

The mathematical transformation from real space to gradient space may be performed using an algorithm which calculates and applies the distortion caused by the non-linearity of the gradient fields, as known in the art and described for example in Chin-Ming Lai "Reconstructing NMR images under non-linear field gradients" *J. Phys. E: Sci. Instrum*., Vol. 16, p. 34 (1983). Inversely, a transformation from gradient space to real space may be performed using a distortion-correction algorithm, which is also known for example from U.S. Pat. No. 8,054,079 B2. In this disclosure "distortion-correction" refers to the correction of distortions caused by non-linear gradient fields.

The gradient field map(s) required for these transformations is known, e.g. from the specific gradient coil geometry of the MR imaging system used for the method, and includes the gradient magnetic fields in x-, y- and z-direction, or at least the non-linear components thereof, over the region of interest in which the slice may be positioned.

The nominal size, position and orientation of the target slice may be obtained from a usual planning or positioning procedure. This may be performed by first acquiring at least one panning image from an object or subject, in particular a patient, which is to be scanned, and then positioning the target slice on that image. The planning image(s) may include a 3D image. For example, for interventional procedures, first a 2D localizer image and then a high-resolution 3D image may be acquired as planning image. In an exemplary embodiment, the planning image is distortion-corrected, which is generally possible for 3D images, as described above. The planning image(s) may also include 2D images, which may also be distortion corrected. 2D distortion correction may be a good approximation of 3D distortion correction, especially if the slices are at suitable positions, such as on the z=0 or x=0 plane.

After planning the nominal size, position and orientation of the target slice, a set of points within the target slice is selected and is transformed into gradient space, e.g. using a distortion algorithm as mentioned above. The points are distributed over the plane of the target slice. The coordinates of these points may then be subjected to the distortion algorithm, resulting in a distorted set of points. The distortion may result in a shift, tilt and curvature, so that the distorted set of points does not lie on a plane, but e.g. on a “potato chip”. Nevertheless, the set of points may be said to define a “distorted slice in gradient space”.

Since the slice which is to be acquired is typically parametrized in terms of gradient coordinates, i.e. in gradient space, ideally one would desire to acquire an image of this distorted slice in gradient space, which will effectively correspond to the target slice in real space. In theory, it is possible to acquire curved slices in gradient space. This has been discussed in literature, e.g. in https://pubmed.ncbi.nlm.nih.gov/24006118/. However, such features are typically not available on clinical scanners.

Therefore, the disclosure provides a different solution, namely to calculate the position and orientation of a new slice, which approximates the position and orientation of the distorted slice in gradient space, wherein the new slice is obtained by shifting and/or tilting the target slice. Only a shifting and tilting operation is allowed, so that the new slice may be acquired using the same scan parameters in terms of pixel size, field-of-view and preferably acquisition time and quality as planned for the target slice. The new slice is not curved in gradient space, but planar (in other words it lies within a plane) and can therefore be acquired using normal MR image acquisition techniques.

In a next step, a two-dimensional magnetic resonance image is acquired by excitation of the new slice in gradient space. The 2D image may be reconstructed from the acquired raw data as known in the art, e.g. by using Fast Fourier Transform algorithms.

Finally, in a post-processing step, a two-dimensional distortion correction of the two-dimensional image is performed in order to remove in-plane distortions due to non-linearity of the gradient fields. Such distortion correction algorithms are known in the art.

Thus, the method of the disclosure provides a solution for both out-of-plane and in-plane distortions due to non-linearity of the gradient fields. By using a set of points distributed over the target image, the whole image is considered and the new slice position is chosen in a way that not every point from the distorted set of points is necessarily directly located within the scanned plane. All other parameters (pixel size, field-of-view) may be taken over from the originally planned (target) slice. The slice that is actually scanned is not necessarily planar in real space. Rather, in an exemplary embodiment, the acquisition of the new slice results in an image of a slice in real space which is approximately located in the plane of the target slice. Thus, the method of the disclosure improves distortions due to non-linear gradient fields in situations where out-of-plane displacement and distortion is significant.

The method of the disclosure may be applied to stacks of 2D images, i.e. a plurality (e.g. 2 to 20, preferably 3 to 15 of 2D images positioned one on top of the other in a “stack”, which are to be acquired sequentially or interleaved. Stacks of 2D temperature mapping images are often used for monitoring of thermal ablation procedures. If the position and orientation of an ablation applicator, such as a microwave (MW) or laser-induced interstitial thermal therapy (LITT), was derived from a 3D distortion corrected image, then in the state of the art, the monitoring images will be positioned not at the optimal position due to the uncorrected slice excitation. The disclosure assists in correct positioning of the ablation applicator.

Without the method of the disclosure, a further complication occurs for stacks of 2D distortion corrected images after 3D reformatting. As the 2D images can be strongly displaced from their nominal position, the anatomy shown on 3D reformats will be very different depending on the orientation of the original images (e.g., transverse vs. sagittal). This can be confusing for physicians/surgeons, who want to use such reformats for therapy planning. The method of the disclosure mitigates this problem and allows to view a stack of 2D images in a 3D format, e.g. on a 3D workstation.

According to an embodiment of the inventive method, when applied to a stack of 2D images, the set of points will be defined for each target image of the stack individually. Thus, if the original slices are equidistant, the planned slices in gradient space (new slices) are not necessarily equidistant. However, the slices which are acquired will be closer to the target stack of 2D images.

In the prior art, it is an accepted feature that 2D distortion correction fails far away from the iso-center because of out-of-plane distortion. For this reason, all imaging procedures requiring 2D imaging are automatically confined to a smaller volume than procedures which can use 3D distortion correction. With the method of the disclosure, this is no longer true and the imaging volume for 2D images can effectively be strongly increased. This is possible without any impact on the planning user interface. In particular, there is no need to display a distorted scan box in the planning segment. This is possible, because the displayed scan parameters usually stay the same and even the scan time in most cases will stay the same. The only visible effect will be that the scanned slices will cover exactly the required anatomy because of the slice shift/tilt.

The method of the disclosure is advantageously applied in large bore (>55 cm, preferably >60 cm, more preferred >65 cm diameter bore), MR scanners, where the bore diameter may be large compared with the length of the gradient coil. Moreover, all kinds of image guided therapies using 2D magnetic resonance imaging (MRI) slices may profit from the disclosure.

According to an embodiment, the two-dimensional size and shape of the new slice in gradient space is the same as that of the target slice in real space. This is advantageous, because thereby the same scan parameters may be used, and preferably the scan time remains the same. However, one must keep in mind that the set of points may have substantial sideward distortion, which is not removed by the re-positioning (shifting and/or tilting) of the slice. In extreme circumstances, this may mean that structures of interest can be moved outside the acquired image by the sideward distortion. The method of the disclosure may mitigate this by ensuring that in the end, the center of the acquired image still approximately represents the center of the originally planned target slice.

This may be achieved in an embodiment, in which the shifting of the target slice is constrained to one direction, in particular a direction which is perpendicular to the plane of the target slice. This may serve the requirement that the new slice should not require any change in acquisition/scan parameters related to scan time and/or image quality, although the overall acquisition time may be slightly different. In an embodiment, the shifting and/or tilting of the target slice is constraint to a shifting only (no tilting), in particular to a shift in one direction, e.g. a direction perpendicular to the plane of the target slice.

According to an embodiment, the tilting of the target slice is constrained to be around an axis within the target slice or within the shifted target slice. The axis may cross the center of the slice. Thereby, it is ensured that there is no over- or under-correction of the slice position in combination with the following 2D distortion correction step.

According to an embodiment, the set of points within the target slice comprises 5 to 40, preferably 8 to 30 points which are distributed across the target plane. In particular, the points may be arranged in a pre-determined point pattern. According to an embodiment, the points may be arranged on a plurality of concentric circles or rectangles. For example, one point may be in the center of the slice, and further points may be arranged in concentric circles around the center point, with e.g. 4 to 12 points in each circle, and e.g. 2 to 6 concentric circles. Alternatively, the points may be arranged on a grid, e.g. a rectangular grid. Further, points may be spatially distributed in a manner such that locations near the center of the slice are sampled more densely, to emphasize the contribution of the points near the center of the slice to the computations for the new slice. According to an embodiment, the transformation from real space to gradient space is performed for each point in the set of points. The number and pattern of the points may be chosen so as to ensure good positioning of the new slice, at an acceptable computing time (e.g. less than 20 sec, preferably less than 5 sec., ideally less than 1 sec) for the steps (c) an (d). The set of points is also referred to herein as point pattern.

According to an embodiment, step (d) includes minimizing at least one out-of-plane distance between the new slice and the distorted slice in gradient coordinate space. An out-of-plane distance is preferably a distance between a point and a plane, taken perpendicular to the plane. Thus, preferably an out-of-plane distance may be calculated between each distorted point and the new slice (which is planar and therefore has single perpendicular direction). According to an embodiment, the root-mean-square (RMS) of the out-of-plane distances of all or at least some of the points in the point pattern is minimized. In another embodiment, the distances may be weighted by spatially dependent weighting factors prior to RMS minimization, to emphasize goodness of fit in certain locations, such as center of the slice. The minimization may be done using a known optimization algorithm, for example a gradient-descent method. The minimization may use the constraints named above, i.e. the position and orientation of the new slice must be obtained by a shift and/or tilt of the target slice, in particular a shift in a direction perpendicular to the target slice and/or a tilt around an axis through the slice or the shifted slice.

According to an embodiment, step (d) includes minimizing the maximum out-of-plane distance between the new slice and the distorted slice in gradient coordinate space. The maximum out-of-plane distance between the distorted slice and the new slice may be the out-of-plane distance of that point in the point pattern, which is furthest way from the new slice. By minimizing this distance, one may obtain that the new slice is in a plane which approximates the non-planar distorted slice. In another embodiment, the distances may be weighted by spatially dependent weighting factors prior to minimization of the maximum distance, to emphasize goodness of fit in certain locations, such as center of the slice.

According to an embodiment, the method comprises the further steps of receiving a set of scan parameters for acquiring the target slice and outputting a set of amended scan parameters for acquiring the new slice, wherein the only scan parameters that have been amended are the position and/or the orientation, and optionally the thickness, of the slice from which an image is to be acquired. As described herein, it is possible to acquire the new slice using the originally planned scan/acquisition parameters of the target slice, with the exception of position and orientation, and optionally slice thickness (which may affect scan time). Other parameters like the type of MR imaging protocol, pixel size, size of field-of-view, echo time, etc. remains the same.

The MR imaging protocol used to acquire the new slice may be e.g. a turbo spin-echo, echo-planar imaging, gradient echo sequence, or any other MRI sequence. In addition, the method of the disclosure may be used for the application of any spatially selective RF pulses such as refocusing pulses as well as inversion, saturation and other preparation pulses.

According to an embodiment, the method includes the further steps of calculating or estimating at least one out-of-plane distance between the target slice in real space and the distorted slice in gradient space, and selecting the new slice for excitation if said out-of-plane distance has a larger absolute value than the at least one out-of-plane distance between the new slice in gradient space and the distorted target slice in gradient space. Thereby, it can be tested if the optimization procedure was successful and if the new slice position is really superior in terms of this criterion compared with the original slice position; if not, the original slice position of the target slice can be used. Alternatively, either the shifting or the tilting which is performed on the target slice to reach the new slice, can be discarded. At least one out-of-plane distance may be calculated as described above. It may the RMS of the set of points, or it may be the maximum out-of-plane distance. This embodiment guarantees that the final result is not worse than regular 2D distortion correction applied to a slice, for which the position and orientation is manually optimized based on a trial-and-error approach.

According to an embodiment, the method includes a further step of issuing a warning to an operator, if the out-of-plane distance between the acquired new slice and the nominal target slice exceeds one or more threshold values. In an exemplary embodiment, in order to estimate the position of the acquired new slice, a distortion correction algorithm may be applied to the new slice in gradient coordinates, in particular to a set of points from the new slice. It is then possible to calculate an out-of-plane distance between the target slice (which is planar) and one or several of the set of points after distortion correction. The warning may be an optical or acoustic signal. It may include a suggestion to re-acquire the image at the nominal slice position.

According to an embodiment, the two-dimensional distortion correction is performed by an algorithm which is also adapted to calculate or estimate the out-of-plane distance between the acquired new slice and the nominal target slice in real space. Thereby, the 2D distortion correction algorithm in addition performs a check on the remaining out-of-plane distance. As described above, it could for example mark the acquired slice as invalid if a certain threshold in the out-of-plane distance is exceeded. Thereby, the gradient linearity volume can effectively be increased. Algorithms for distortion correction due to gradient non-linearities are generally described e.g. in U.S. Pat. No. 8,054,079 B2. Alternatively, the algorithm may be adapted to calculate or estimate the out-of-plane distance between the new slice and the distorted target slice in gradient space.

According to an embodiment, the method comprises the steps of receiving a nominal slice thickness of the target slice in real space, and calculating a lower surface and an upper surface of the target slice in real space; performing a transformation of a set of points within the lower surface and the upper surface of the target slice into gradient space by using the gradient field maps, resulting in a lower surface and an upper surface in gradient space which are distorted due to the non-linearity of the gradient fields; estimating the distance between the distorted lower surface and distorted upper surface in gradient space and comparing the distance to the nominal slice thickness; optionally adjusting the thickness of the new slice from the nominal thickness to the estimated distance, in particular if the difference between the nominal thickness and the estimated difference exceeds a pre-determined threshold value. Thereby, an adjustment of the slice thickness can be performed if necessary, by estimating the distance between the lower surface and the upper surface of each slice after distortion in a similar way as the position of the slice center.

According to a further aspect, the disclosure is directed to a computer program comprising computer-readable instructions which, when carried out by a control unit (controller) of a magnetic resonance imaging system, will cause the controller of the magnetic resonance imaging system to carry out the method of the disclosure, as far as it is computer-implemented, i.e. with the exception of the data acquisition step. All other steps are essentially computing steps which may be performed by a processing unit, e.g. as part of a computer, mobile device, cloud computer, workstation, or controller of a MR system. The disclosure is also directed to a respective computer program product.

According to a further aspect, the disclosure is directed to a non-transitory computer-readable medium comprising such a computer program. The medium may be any form of storage medium, in particular digital storage medium, such as a hard disk, solid state storage medium such as SD-card or SSD-card, optical storage medium such as CD-ROM, magnetic storage medium or cloud memory.

According to a further aspect, the disclosure is directed to a magnetic resonance imaging system for examining a subject, in particular a patient, the magnetic resonance imaging system comprising a magnetic resonance imaging scanner and a controller, which is configured to carry out the method according to the disclosure. The controller may carry out the calculation and optimization steps, and the MR scanner may perform the actual data acquisition of the new slice.

All features and advantages described with respect to the method also apply to the magnetic resonance imaging system, the computer program (product) and the computer-readable storage medium, and vice versa.

FIG. 1 generally illustrates the principles of distortion and distortion correction. The upper image 10 shows the image of a grid in real space, i.e. with distortion correction, the lower image 12 shows the same grid distorted by gradient non-linearity (in gradient space). The center line 14, which for example crosses the magnet iso-center, is not distorted. The x-direction is indicated by the arrow pointing from left to right. The system has a distortion in positive x-direction, which causes the target layer 16 to move to the right, to the position of line 17 in gradient space. If the x-position of the layer is chosen in gradient space (gradient coordinates) in such a way that it lies at exactly this position in real space (real 3D coordinates), then one will scan a layer that in reality lies to the left of the target position, namely at the position of the dashed line 18. In order to excite a slice close to the target slice 16 in real space, one has to scan at a position to the right of the actual slice position; this position 17 is obtained by applying the distortion algorithm and not by applying its inversion (distortion correction). Thus, line 17 indicates the correct position of the slice 16 in gradient space 12.

Figure 2:
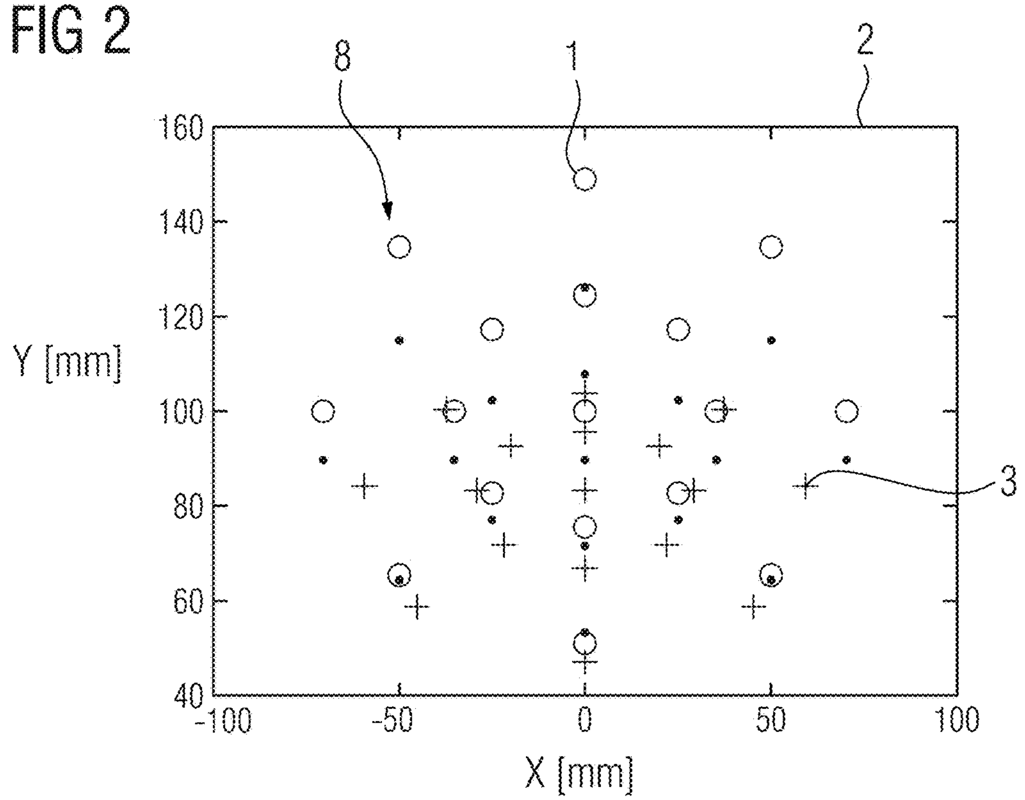
FIG. 2 shows a point pattern in real space (circles), in gradient space (crosses) and a point pattern corresponding to the new slice (dots) in the x-y plane according to the disclosure.
Figure 3:
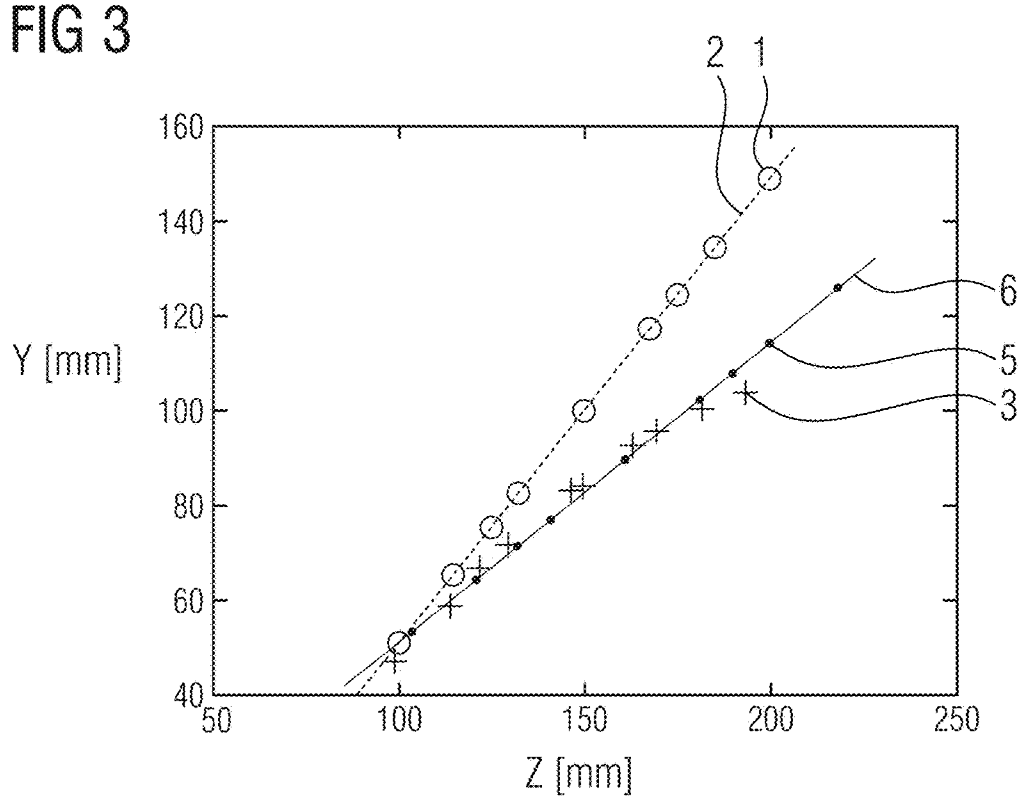
FIG. 3 shows the point patterns of FIG. 2 in the y-z plane according to the disclosure.

FIGS. 2 and 3 illustrate an embodiment of the method of the disclosure by means of a point pattern 8 in real coordinates (real space) and gradient coordinates (gradient space), wherein FIG. 2 shows a projection of the point patterns 8 onto the x-y plane and FIG. 3 shows a projection of the point patterns onto the y-z plane.

First, the position of a target slice 2 is selected in real space and a representative pattern 8 of points within the slice is chosen, as indicated by the circles 1. These points 1 are then transformed from real space into gradient space using a distortion algorithm. In the gradient coordinate system, the points 1 are moved away from their original positions to the positions of the crosses 3. It is evident from FIG. 3 that the distorted set of points 3 are no longer on a plane in gradient space. However, a clinical imaging protocol can only scan a planar slice. By using the proposed algorithm, the original slice 2 is therefore shifted and tilted into new slice 6, so that the out-of-plane distance of the distorted points 3 to the new slice 6 is minimized. The point pattern corresponding to the new slice 6 is shown as dots 5.

Figure 4:
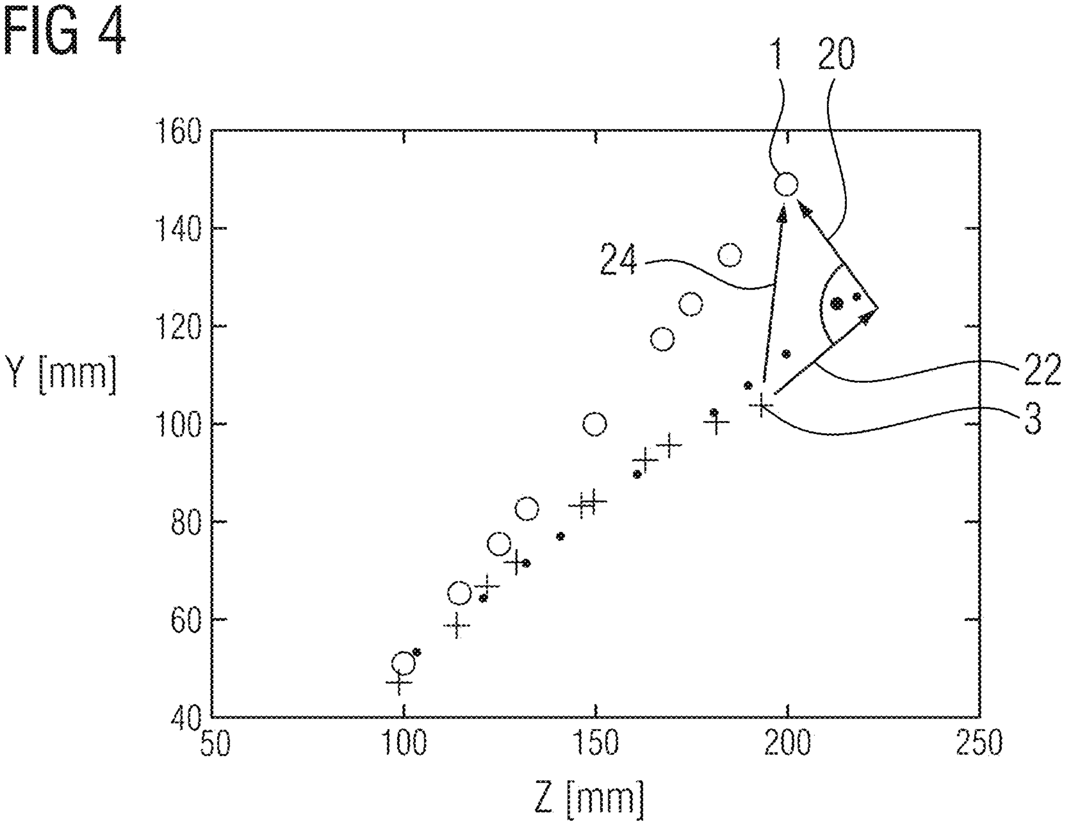
FIG. 4 shows the point patterns of FIG. 2 in the y-z plane with in-plane distortion correction indicated according to the disclosure.

FIG. 4 further illustrates the correction method according to an embodiment of the disclosure. Again, the circles 1 indicate the point pattern on the target plane 2 in real space. The crosses 3 indicated the same points in gradient space, i.e. with distortion. A 3D distortion correction would map the points indicated by crosses 3 back to the circles 1, as indicated by arrow 14. However, this is not possible in 2D scanning. Therefore, a vector decomposition into in-plane (arrow 22) and out-of-plane (arrow 20) distortion is effectively made. The out-of-plane distortion 20 is corrected by shifting and tilting of the original plane 2 into a new slice 6 marked by the dots 5. Once a 2D image of this slice 6 has been acquired, a 2D distortion correction algorithm is applied in order to "move" the crosses 3 at least close to the position of the dots 5 (arrow 22). Thereby, both out-of-plane and in-plane distortion is corrected for.

Figure 5:
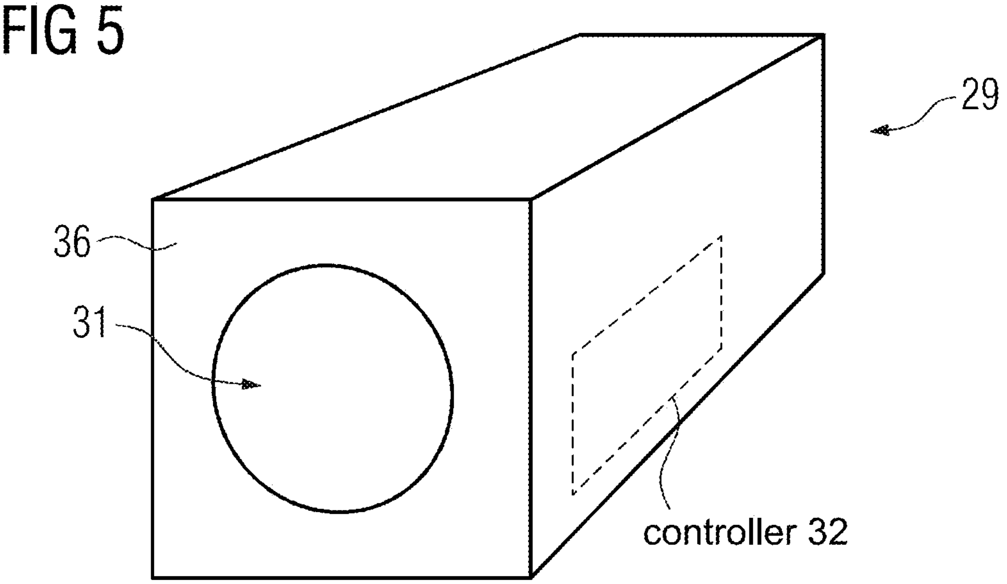
FIG. 5 shows a magnetic resonance imaging system according to the disclosure.

FIG. 5 illustrates a magnetic resonance imaging system 29 according to one or more exemplary embodiments of the disclosure. The magnetic resonance imaging system 29 may comprise scanner 36 and controller 32. The scanner 36 may include a main magnet unit which comprises a main magnet for generating the main magnet field and a cylindrical patient receiving space 31 into which a patient can be moved by means of a patient support (not shown) for examination. The scanner 36 may also include a gradient coil arrangement and a radiofrequency coil arrangement that may surround the patient receiving space 31. The operation of the magnetic resonance imaging system 29, including the operation of the scanner 36, may be controlled by a controller 32. The controller 32 may be an internal component of the scanner 36 and/or be externally located and communicatively connected to the scanner 36.

The controller 32 may include one or more processors and a memory storage means (memory) in which a wide variety of information, for example, imaging data and/or program instructions, may be stored. In an exemplary embodiment, the controller 32 may include processing circuitry that is configured to perform one or more functions of the controller 32. The controller 32 may execute computer-readable instructions (e.g., stored in the memory and/or accessed by the processor, such as from an external memory) to cause the magnetic resonance imaging system 29 to perform one or more functions/operations of the magnetic resonance imaging system 29, which may include performing the method according to the disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A method for acquiring a two-dimensional magnetic resonance image of a slice through a region of interest, the method comprising:

receiving a gradient field map of the region of interest, the gradient field map defining a transformation from a real space to a gradient space, the gradient space being distorted with respect to the real space due to a non-linearity of gradient fields;

receiving a nominal size, position, slice thickness, and orientation of a target slice, from which the image is to be acquired, in the real space;

calculating a lower surface and an upper surface of the target slice in the real space;

transforming, using the gradient field map, a set of points within the target slice into the gradient space to determine a distorted set of points defining a distorted slice in the gradient space;

transforming, using the gradient field map, a set of points within the lower surface and the upper surface of the target slice into the gradient space to obtain a lower surface and an upper surface in the gradient space which are distorted due to the non-linearity of the gradient fields;

estimating a distance between the distorted lower surface and distorted upper surface in the gradient space and comparing the distance to the nominal slice thickness;

determining a position and orientation of a new slice that approximate a position and orientation of the distorted slice in the gradient space, wherein the new slice is obtained by shifting and/or tilting the target slice;

adjusting a thickness of the new slice from the nominal thickness to the estimated distance;

exciting the new slice in the gradient space to acquire a two-dimensional magnetic resonance image; and performing a two-dimensional distortion correction of the two-dimensional image to remove in-plane distortions due to non-linearity of the gradient fields.

2. The method of claim 1, wherein the two-dimensional size and shape of the new slice are the same as the two-dimensional size and shape that of the target slice.

3. The method of claim 1, wherein the shifting of the target slice is constrained to one direction perpendicular to the plane of the target slice.

4. The method of claim 1, wherein the tilting of the target slice is constrained to be around an axis within the target slice or within the shifted target slice.

5. The method of claim 1, wherein determining the position and orientation of the new slice comprises minimizing at least one out-of-plane distance between the new slice and the distorted slice.

6. The method of claim 1, wherein determining the position and orientation of the new slice comprises minimizing a maximum out-of-plane distance between the new slice and the distorted slice.

7. The method of claim 1, further comprising:

receiving a set of scan parameters for acquiring the target slice; and outputting a set of amended scan parameters for acquiring the new slice, wherein the only scan parameters that have been amended in the set of amended scan parameters are the position and/or the orientation of the slice from which an image is to be acquired.

8. The method of claim 1, wherein the set of points within the target slice comprises 5 to 40 points which are distributed across the target slice.

9. The method of claim 1, further comprising:

calculating or estimating at least one out-of-plane distance between the target slice in the real space and the distorted slice in the gradient space; and selecting the new slice for excitation in response to the out-of-plane distance having a larger absolute value than the at least one out-of-plane distance between the new slice in the gradient space and the distorted target slice in the gradient space.

10. The method of claim 1, wherein the performing the two-dimensional distortion correction uses an algorithm adapted to calculate or estimate the out-of-plane distance between the acquired new slice and the nominal target slice in the real space.

11. The method of claim 10, wherein the algorithm is further adapted to calculate or estimate the out-of-plane distance between the new slice and the distorted target slice in the gradient space.

12. The method of claim 1, further comprising generating a notification in response to the out-of-plane distance between the acquired new slice and the nominal target slice exceeding one or more threshold values.

13. A non-transitory computer-readable storage medium with an executable program stored thereon, that when executed, instructs a processor to perform the method of claim 1.

14. A magnetic resonance imaging system for examining a subject, the magnetic resonance imaging system comprising:

a magnetic resonance scanner; and a controller adapted to:

obtain a gradient field map of the region of interest, the gradient field map defining a transformation from a real space to a gradient space, the gradient space being distorted with respect to the real space due to a non-linearity of gradient fields;

obtain a nominal size, position, slice thickness, and orientation of a target slice, from which the image is to be acquired, in the real space;

calculate a lower surface and an upper surface of the target slice in the real space;

transform, using the gradient field map, a set of points within the target slice into the gradient space to determine a distorted set of points defining a distorted slice in the gradient space;

transform, using the gradient field map, a set of points within the lower surface and the upper surface of the target slice into the gradient space to obtain a lower surface and an upper surface in the gradient space which are distorted due to the non-linearity of the gradient fields;

estimate a distance between the distorted lower surface and distorted upper surface in the gradient space and comparing the distance to the nominal slice thickness;

determine a position and orientation of a new slice that approximate a position and orientation of the distorted slice in the gradient space, wherein the new slice is obtained by shifting and/or tilting the target slice;

adjust a thickness of the new slice from the nominal thickness to the estimated distance;

control the magnetic resonance scanner to excite the new slice in the gradient space to acquire a two-dimensional magnetic resonance image; and perform a two-dimensional distortion correction of the two-dimensional image to remove in-plane distortions due to non-linearity of the gradient fields.

15. A device comprising:

one or more processors; and memory storing instructions that, when executed by the one or more processors, configure the device to:

obtain a gradient field map of the region of interest, the gradient field map defining a transformation from a real space to a gradient space, the gradient space being distorted with respect to the real space due to a non-linearity of gradient fields;

obtain a nominal size, position, slice thickness, and orientation of a target slice, from which the image is to be acquired, in the real space;

calculate a lower surface and an upper surface of the target slice in the real space;

transform, using the gradient field map, a set of points within the target slice into the gradient space to determine a distorted set of points defining a distorted slice in the gradient space;

transform, using the gradient field map, a set of points within the lower surface and the upper surface of the target slice into the gradient space to obtain a lower surface and an upper surface in the gradient space which are distorted due to the non-linearity of the gradient fields;

estimate a distance between the distorted lower surface and distorted upper surface in the gradient space and comparing the distance to the nominal slice thickness;

determine a position and orientation of a new slice that approximate a position and orientation of the distorted slice in the gradient space, wherein the new slice is obtained by shifting and/or tilting the target slice;

adjust a thickness of the new slice from the nominal thickness to the estimated distance;

obtain a two-dimensional magnetic resonance image based on an excitation of the new slice in the gradient space; and perform a two-dimensional distortion correction of the two-dimensional image to remove in-plane distortions due to non-linearity of the gradient fields.

16. The device of claim 15, wherein the obtaining of the two-dimensional magnetic resonance image comprises controlling a magnetic resonance scanner to excite the new slice in the gradient space to acquire the two-dimensional magnetic resonance image.

* * * * *